UNITED STATES PATENT OFFICE.

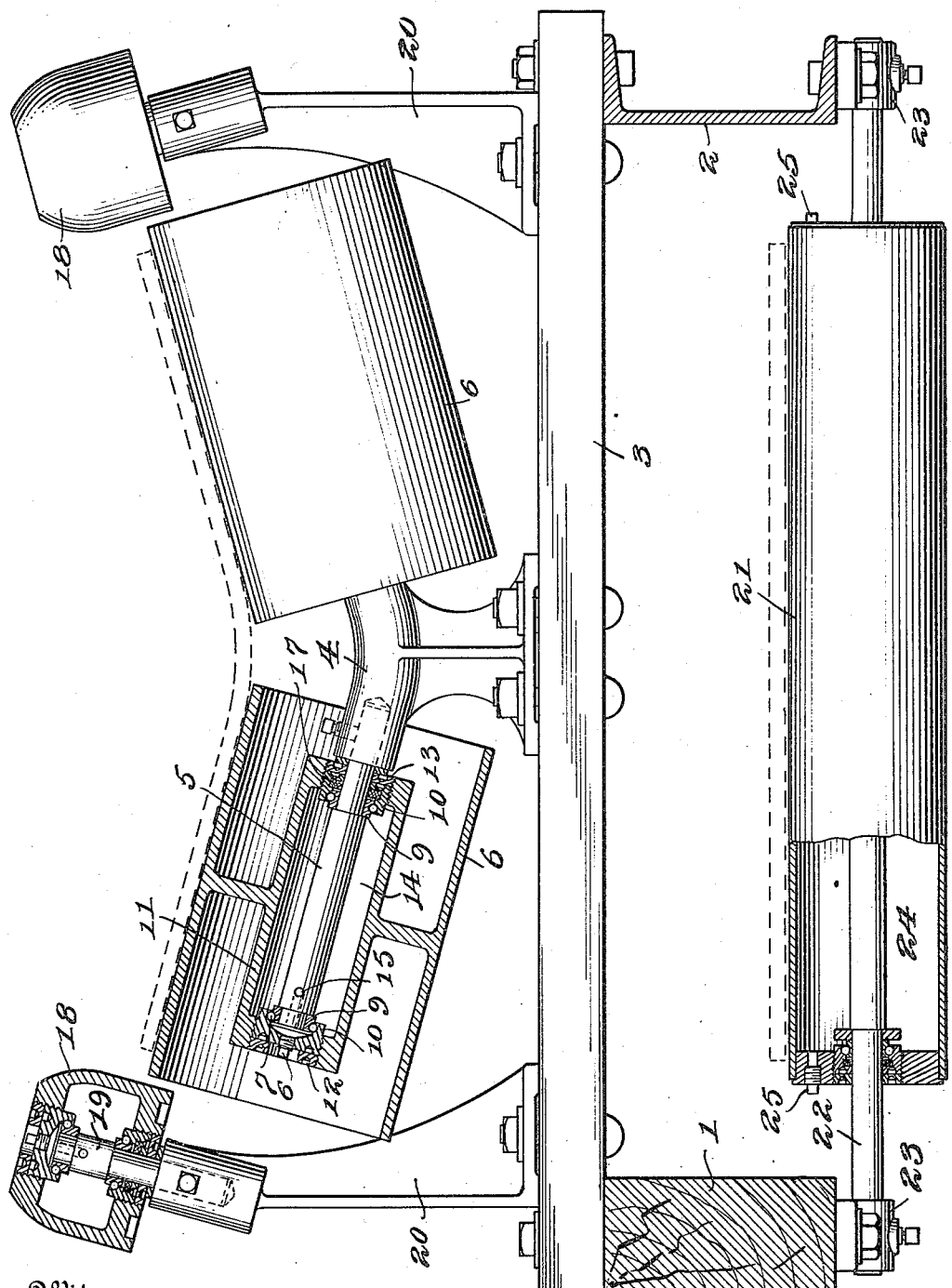

WALTER J. ARMSTRONG, OF COLUMBUS, OHIO, ASSIGNOR TO THE JEFFREY MANUFACTURING COMPANY, OF COLUMBUS, OHIO, A CORPORATION OF OHIO.

BELT-IDLER.

1,156,386.  Specification of Letters Patent.  Patented Oct. 12, 1915.

Application filed December 27, 1913. Serial No. 809,106.

*To all whom it may concern:*

Be it known that I, WALTER J. ARMSTRONG, a citizen of the United States, residing at Columbus, in the county of Franklin and State of Ohio, have invented certain new and useful Improvements in Belt-Idlers, of which the following is a specification, reference being had therein to the accompanying drawing.

The principal object of this invention is to provide a belt idler having an improved bearing construction and improved means for supplying lubricant to the bearing construction.

The drawing, which shows the embodiment of the invention now deemed preferable, is primarily an end elevation, but some of the parts are in section to make the construction more clear.

Referring to the drawing, 1, 2 and 3 represent elements of the supporting framework, the details of which form no part of this invention. Centrally mounted upon the frame member 3 is a bracket 4 which carries two spindles 5. Each spindle is inclined upward and is arranged substantially perpendicularly to the line of travel of the belt, which is indicated by dotted lines. Mounted upon each spindle 5 is an idler pulley 6 upon which the upper strand of the belt is carried. Each idler pulley 6 is supported on the corresponding spindle 5 by means of two ball-bearings 7 and 8. Each ball-bearing comprises an inner ring 9 secured to the spindle 5, and an outer ring 10 secured to the idler 6. The two rings are provided with races for the balls. The idler 6 is provided with an inner hollow cylinder 11 which is provided with apertures at its ends. The walls of the apertures have threads which engage similar threads of the rings 10. By turning the rings 10, they can be adjusted with respect to the rings 6, and the ball-bearings can be in this way tightened or loosened. At 12 there is provided a lock nut for the ring 10 of the bearing 7, and at 13 there is provided a lock nut for the ring 10 of the bearing 8.

In order that the chamber 14 within the cylinder 11 may be filled with lubricant, I provide the passageway 15 in the end of the spindle 5. One end of this passageway communicates with the chamber and the other end communicates with the end of the spindle.

16 is a plug in the ring 10 of the bearing 7, and when this plug is removed lubricant can be introduced into the chamber 14 through the passageway 15. In order to prevent the escape of lubricant through the ball-bearing 8, I provide a washer 17 which is seated in a suitable recess in the ring 10 of the said bearing. The washer is preferably formed of resilient material.

It will be seen that the construction which I have described provides a substantially tight lubricant chamber in which the two ball-bearings run. This chamber can be filled with lubricant and the bearings will require no further attention until the supply of lubricant in the chamber is exhausted.

18, 18 are two guide-pulleys for the belt and these are mounted on spindles 19 secured in the standards 20, 20. The bearing construction for the idlers 18, 18 is substantially the same as that before described for the idlers 6, 6 and repetition will be unnecessary.

21 is an idler for supporting the return strand of the belt. It is mounted upon the horizontal spindle 22 which is held in suitable brackets 23, 23 secured to the frame members 1 and 2. The idler 21 is provided with two similar bearings, each of which is similar to the bearing 8 already described for the idler 6. The idler 21 is hollow and the chamber 24 therein serves as a lubricant reservoir for the bearings. Lubricant can be introduced into this reservoir 24 through apertures in the end walls of the idler. These apertures are normally closed by means of the plugs 25, 25.

What I claim is:

1. In a belt idler, the combination of an idler pulley having a central lubricant chamber with an opening at each end, means secured to the pulley for closing the opening at one end, the said means having a central lubricant aperture therein, a spindle extending through the other aperture and through the chamber and having therein a lubricant passageway registering with the said lubricant aperture and extending to the said chamber, and bearings positioned in the chamber.

2. In a belt idler, the combination of an idler pulley having a central lubricant chamber, a spindle extending through the said chamber and having therein a lubricant passageway extending from one end thereof to the chamber, and two ball bearings positioned in the chamber each having its non-rotating member secured to the spindle and its rotating member secured to the pulley, the rotating member adjacent the said passageway having a lubricant aperture registering therewith.

3. In a belt idler, the combination of an idler pulley having a central lubricant chamber with an opening at each end, a spindle extending through the said chamber and having therein a lubricant passageway extending from one end thereof to the chamber, and two ball bearings positioned in the chamber each having its non-rotating member secured to the spindle and its rotating member fitted into the corresponding opening in the pulley to close it, the rotating member adjacent the said passageway having a lubricant opening registering therewith.

In testimony whereof, I affix my signature, in presence of two witnesses.

WALTER J. ARMSTRONG.

Witnesses:
JAMES S. DAVIDSON,
DUDLEY T. FISHER.